(12) United States Patent
Polen et al.

(10) Patent No.: US 7,359,933 B1
(45) Date of Patent: Apr. 15, 2008

(54) PROVIDING REMOTE ACCESS TO NETWORK APPLICATIONS USING A DUAL PROXY

(75) Inventors: Randy Polen, Los Altos, CA (US); Edwin Seng Eng Ong, San Francisco, CA (US); Robert J. Wygand, III, San Francisco, CA (US); Aleksandra Vikati, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 811 days.

(21) Appl. No.: 10/259,183

(22) Filed: Sep. 26, 2002

(51) Int. Cl.
*G06F 15/16* (2006.01)
(52) U.S. Cl. .................... 709/203; 709/219
(58) Field of Classification Search ............ None
See application file for complete search history.

(56) References Cited

U.S. PATENT DOCUMENTS

| | | | | |
|---|---|---|---|---|
| 6,012,090 | A * | 1/2000 | Chung et al. | 709/219 |
| 6,035,332 | A * | 3/2000 | Ingrassia et al. | 709/224 |
| 6,073,175 | A * | 6/2000 | Tavs et al. | 709/226 |
| 6,115,742 | A * | 9/2000 | Franklin et al. | 709/224 |
| 6,175,869 | B1 * | 1/2001 | Ahuja et al. | 709/226 |
| 6,446,109 | B2 * | 9/2002 | Gupta | 709/203 |
| 6,470,386 | B1 * | 10/2002 | Combar et al. | 709/224 |
| 6,701,374 | B2 * | 3/2004 | Gupta et al. | 709/238 |
| 6,938,096 | B1 * | 8/2005 | Greschler et al. | 709/239 |
| 2001/0052013 | A1 * | 12/2001 | Munguia et al. | 709/225 |
| 2002/0147812 | A1 * | 10/2002 | Schoettger | 709/225 |
| 2005/0010670 | A1 * | 1/2005 | Greschler et al. | 709/227 |

OTHER PUBLICATIONS

Appgate Network Security Products, "How it Works: Steps 1-6", http://www.appgate.com/products/howitworks.htm, Dec. 30, 2002
Neoteris, "Instant Virtual Extranet", www.neoteris.com.
Neoteris, Instant Virtual Extranet Overview, www.neoteris.com/products/functoverview.html, Dec. 30, 2002 Netegrity, Securely Managing e-business, "Products" http://www.netetrity.com/products.

(Continued)

*Primary Examiner*—John B. Walsh
(74) *Attorney, Agent, or Firm*—Hickman Palermo Truong & Becker LLP

(57) ABSTRACT

A system and method are disclosed for providing remote access to network applications using a dual proxy. A request is received via a first network, from a remote client on the first network, to access a second network. A client side proxy applet is provided to the remote client. Client side application software associated with an application residing on the second network and installed at the remote client establishes a connection with the client side proxy applet. A server side proxy configured (1) to communicate with the client side proxy applet via the first network and (2) to communicate with an application server via the second network is provided on a proxy server associated with the second network. The client side proxy is configured to relay data between the remote client and the server side proxy and the server side proxy is configured to relay data between the client side proxy applet and the application server.

41 Claims, 11 Drawing Sheets

OTHER PUBLICATIONS

Safeweb, "How SEA Tsunami Works", http://www.safewebinc.com/products.html., Dec. 30, 2002. SEA Tsunami, "The SafeWeb Secure Extranet Appliance (SEA)", www.safeweb.com.

uRoam Corporation: "Comprehensive Secure User Access, Firepass Overview", http://www.uroam.com/index.php?side=home &home=products_enterprise uRoam Inc., "FirePass Product Brief", FirePass Product Brief 20021203.doc.

uRoam Corporation: "Comprehensive Secure User Access, Firepass Overview",http://www.uroam.com/index.php?side=home &home=products_enterprise uRoam Inc., "FirePass Product Brief", FirePass Product Brief 20021203.doc. Dec. 30, 2002.

* cited by examiner

PROVIDING REMOTE ACCESS TO NETWORK APPLICATIONS USING A DUAL PROXY

FIELD OF THE INVENTION

The present invention relates generally to providing remote access to applications on a network. More specifically, providing remote access to network applications using a dual proxy is disclosed.

BACKGROUND OF THE INVENTION

Local area networks (LAN) and wide area networks (WAN) have become ubiquitous. Such networks link computers and other resources together in a network, in which network protocols are used to enable computers and other resources to communicate with each other over the network, such as to exchange data. Often, a private network, such as a LAN, WAN, or other private network is interconnected with other networks, such as the Internet or other private or public networks.

In the case of a private LAN, WAN, or other network connected to a public network such as the Internet, security measures are often put in place to prevent unauthorized users from accessing protected resources on the LAN, WAN, or other network. For example, a LAN or WAN may include one or more application servers used to provide access to application functionality from a server on the network. In many cases, measures are taken to limit access to such applications, so that members of the public will not gain unauthorized access to the applications via the public network.

To use an application, a user typically uses a client system to access the application server via the network by invoking client software associated with the application. The client software establishes a connection to the application server via the network and exchanges requests and responsive data via the network as necessary to perform the tasks desired by the user. Such applications may include file access; data management and storage; electronic mail and other communication applications; supply chain management, human resources, accounting, contact management, and other business applications; etc.

In some cases, the enterprise or entity associated with the LAN or other private network determines it would be advantageous or convenient to allow authorized users to access via the public network, such as the Internet, applications residing on servers or other computers on the private network. One approach that has been used to provide such access is the so-called virtual private network (VPN) approach. FIG. 1A shows a typical virtual private network configuration 100 in which a remote client 102 is configured to connect via a public network 104, such as the Internet, with a virtual private network (VPN) server 106. VPN client software 108 installed on the remote client 102 is invoked to enable the remote client 102 to connect with the private network 110 associated with the VPN server 106, effectively allowing the remote client 102 to access applications and services on the private network 110 as if it were a virtual client 112 on the private network. Once so connected, the remote client 102 may access applications on the private network, such as one or more of the plurality of network applications 114, as if it were a client on the private network 110. While four applications are shown in FIG. 1A, more or fewer applications may be present on private network 110.

The VPN approach has certain disadvantages, however. For instance, it is necessary to install and configure client side VPN software on each client system that the administrators of the private network wish to be able to connect remotely to the private network via the VPN server. In some cases, software from a plurality of vendors must be installed on a single system in order to enable a client system to connect to the private network via the VPN server. The ongoing costs of administration can be high as well, as small changes in the applications on the network may require updating and/or re-configuration of all of the clients to which access via the VPN server is provided. In addition, in many cases a single enterprise may comprise more than one private network, linked together in a LAN or WAN, which makes it even more difficult to implement the VPN model of remote access. Also, use of encryption for security may be difficult using the VPN model. Finally, under the VPN approach the remote user is fully regarded as a node on the private network, which may present a security risk for the private network if the remote system has been compromised by an unauthorized user or software, such as a virus.

Another approach that has been used to provide controlled access to applications residing on servers or other computers on a private network is the so-called "extranet in a box" approach. FIG. 1B shows one typical "extranet in a box" configuration 150. A remote client 152 connects via a public network 154, such as the Internet, with a remote access server 156 associated with a private network 158. Applications 160a, 160b, 160c, and 160d reside on one or more application servers connected to the private network 158. In order to enable a user of the remote client 152 to access one or more of the applications 160a, 160b, 160c, and 160d, special software modules 162a, 162b, 162c, and 162d, respectively, must be written and installed on the remote access server 156. Each software module is specific to a corresponding application (e.g., software module 162a may correspond to application 160a), and is custom written to enable a remote user, such as a user of remote client 152, to access the application for which it is written by using web browser software installed at the remote client 152 to communicate with the remote access server 156 using the hypertext transfer protocol (HTTP). Using this approach, the browser is used to run at the remote client 152 a web-based version of each respective application. This approach does not require the installation of client side VPN or other special software at the remote client 152, as the already-installed browser software is used. However, the features available via a browser-run version typically will be limited, especially when compared to the full capability of the native client application software that would be used to access the application from a client on the private network. One example of such a limitation is the difference between using a full function electronic mail program installed on a client system, such as Microsoft Outlook™, and using a web-based electronic mail service accessed using browser software, such as Microsoft Hotmail™. In addition, this approach requires a lot of customization of the remote access server at the application layer, which in some cases may make it expensive and time consuming to implement, e.g., in environments in which a large number of legacy applications may be present or in which new or updated applications are installed over time.

Therefore, there is a need for a way to provide access via a public network to applications residing on a private network that is secure; does not require special client side software or configuration; is capable of providing access to all applications to which providing such access is desired, including legacy applications, without requiring that custom code be created for each such application; and that allows the remote user to use the native capabilities of the installed client side application software.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

It should be appreciated that the present invention can be implemented in numerous ways, including as a process, an apparatus, a system, or a computer readable medium such as a computer readable storage medium or a computer network wherein program instructions are sent over optical or electronic communication links. It should be noted that the order of the steps of disclosed processes may be altered within the scope of the invention.

A detailed description of one or more preferred embodiments of the invention are provided below along with accompanying figures that illustrate by way of example the principles of the invention. While the invention is described in connection with such embodiments, it should be understood that the invention is not limited to any embodiment. On the contrary, the scope of the invention is limited only by the appended claims and the invention encompasses numerous alternatives, modifications and equivalents. For the purpose of example, numerous specific details are set forth in the following description in order to provide a thorough understanding of the present invention. The present invention may be practiced according to the claims without some or all of these specific details. For the purpose of clarity, technical material that is known in the technical fields related to the invention has not been described in detail so that the present invention is not unnecessarily obscured.

Providing remote access to network applications using a dual proxy is disclosed. In one embodiment, a client side proxy applet is downloaded from a dual homed proxy server. As used herein and in the appended claims, the term "applet" comprises any program that is designed to be executed either directly from an operating system or from within another application. The dual homed proxy server comprises a web server associated with an external IP address and a server side proxy associated with an internal IP address. Data packets are passed from client side application software installed on a remote client to the client side proxy downloaded to the client. The client side proxy is configured to pass data packets between the client side application software and the server side proxy. The server side proxy communicates on behalf of the remote client via the internal connection with one or more applications available on the internal network, and passes response data back to the remote client via the client side proxy, as described more fully below.

Figure 1A:
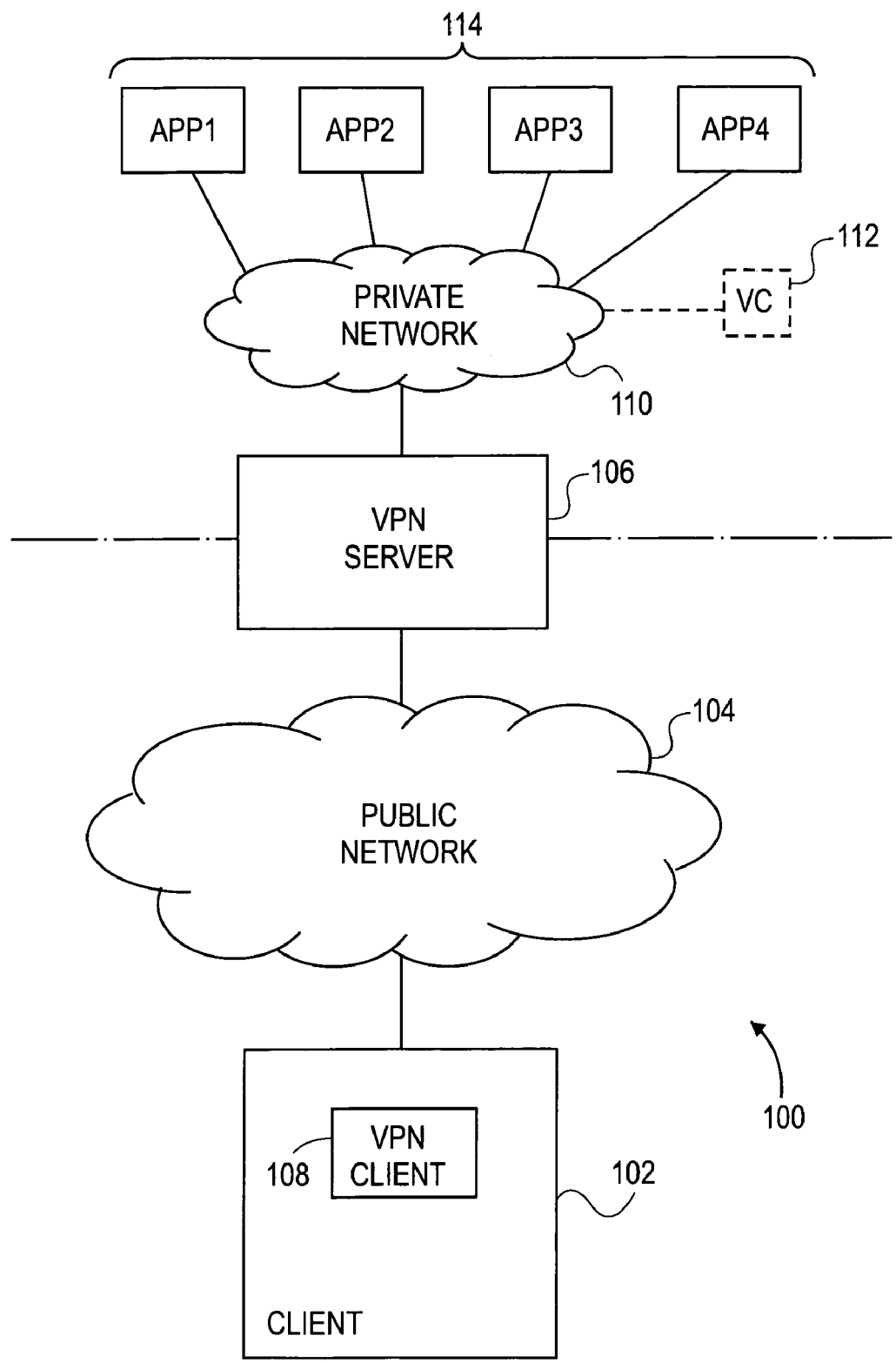
FIG. 1A shows a typical virtual private network configuration 100 in which a remote client 102 is configured to connect via a public network 104, such as the Internet, with a virtual private network (VPN) server 106.
Figure 1B:
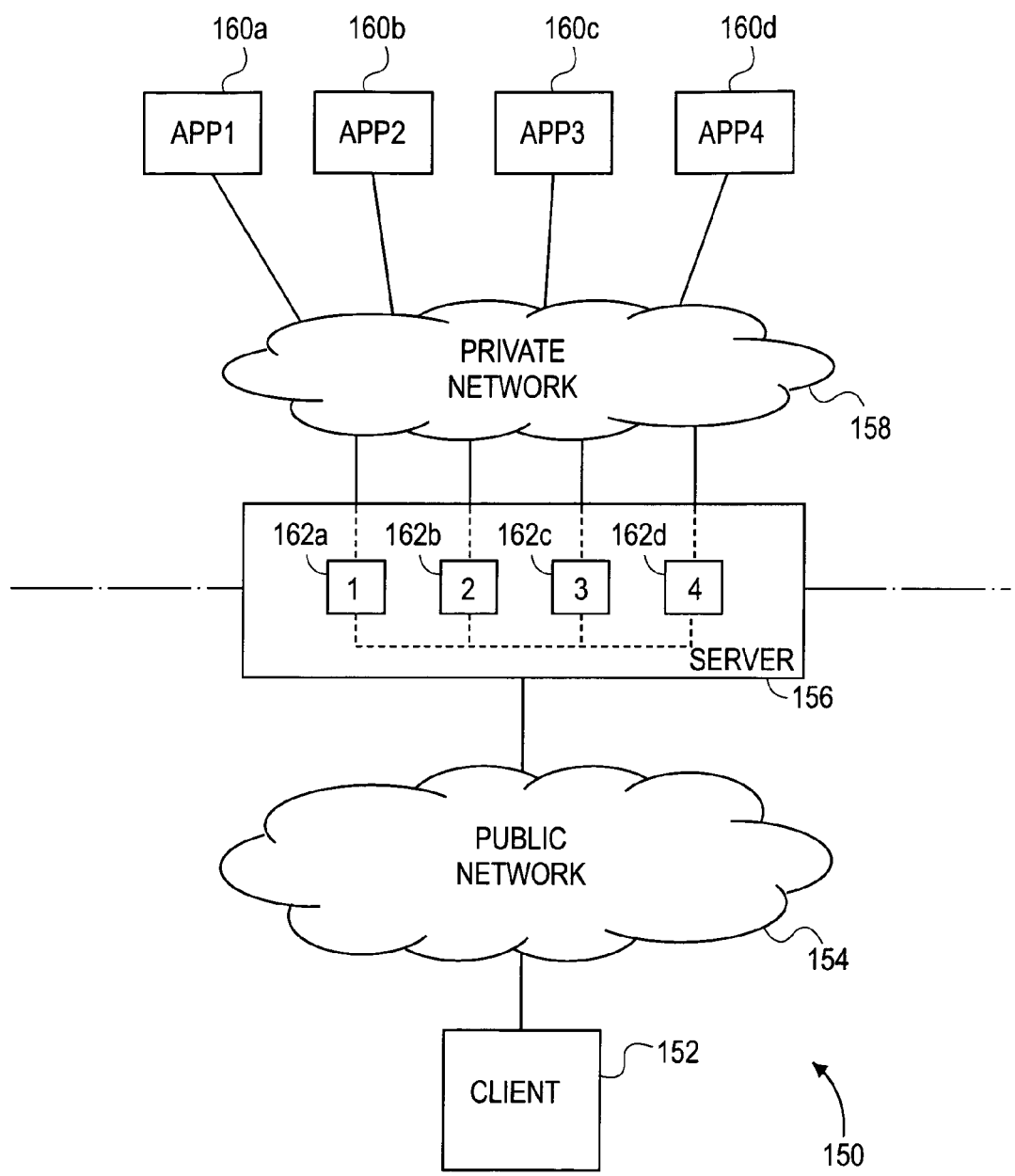
FIG. 1B shows one typical "extranet in a box" configuration 150.
Figure 2:
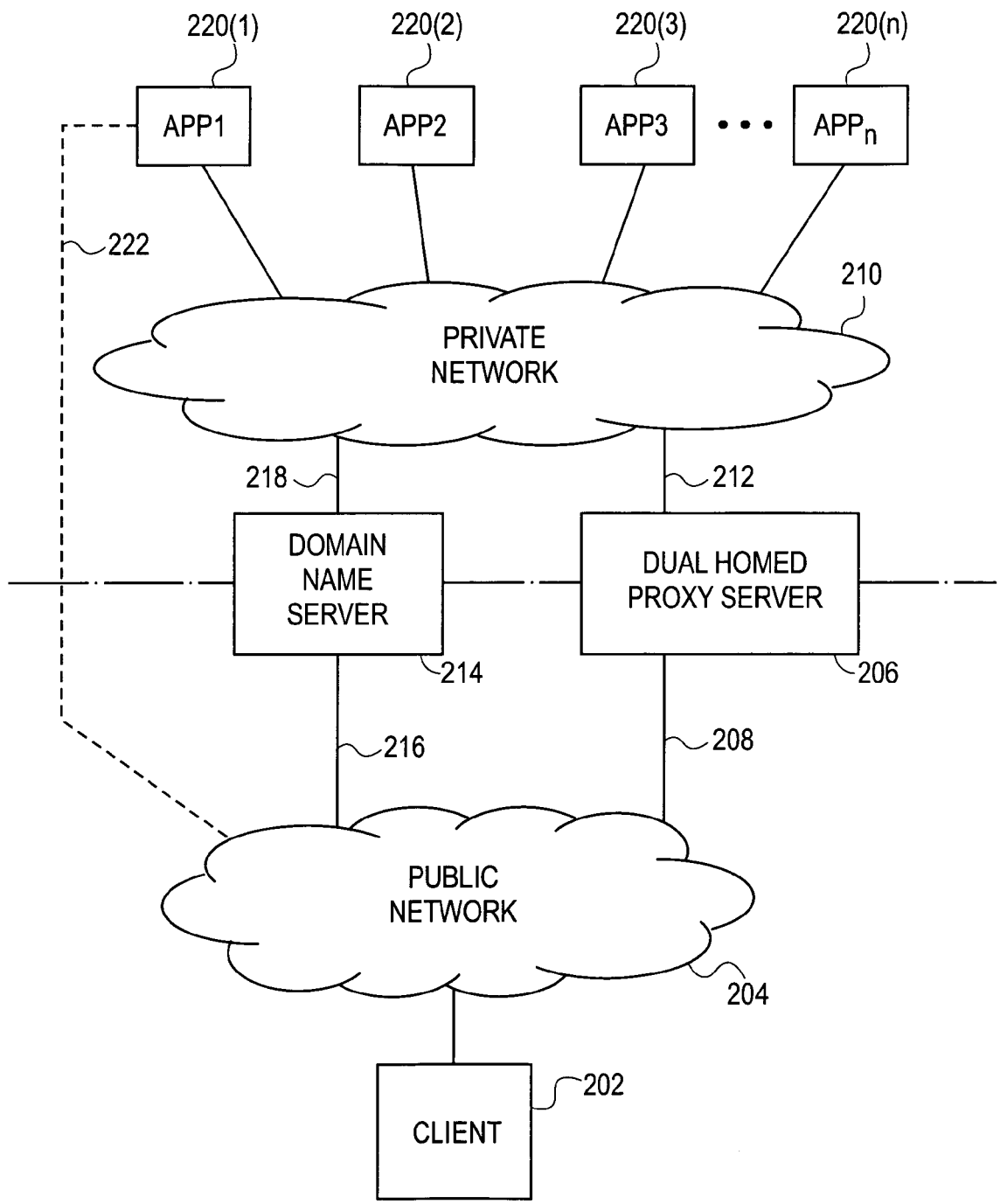
FIG. 2 shows a system used in one embodiment to provide remote access to network applications using a dual proxy.

FIG. 2 shows a system used in one embodiment to provide remote access to network applications using a dual proxy. A remote client 202 is connected to a public network 204, such as the Internet. A dual homed proxy server 206 also is connected to the public network 204 via an external network connection 208. The dual homed proxy server 206 is also connected to a private network 210 via an internal network connection 212. A domain name server 214 associated with the private network 210 has an external network connection 216 to the public network 204 and an internal connection 218 to the private network 210. A plurality of applications 1 through n, representative ones of which are labeled 220(1), 220(2), 220(3), and 220(n) in FIG. 2, are connected to the private network 210. In one embodiment, one or more of the applications 1 through n may have an external connection to the public network 204, such as the optional external connection 222 shown in FIG. 2 as connecting application 220(1) to the public network 204. While shown as a direct connection, the external connection 222 may be made via a router, firewall, and/or other network device. It is not uncommon for certain application servers, such as e-mail exchange servers, to have such an external connection to the external, public network.

Figure 3:
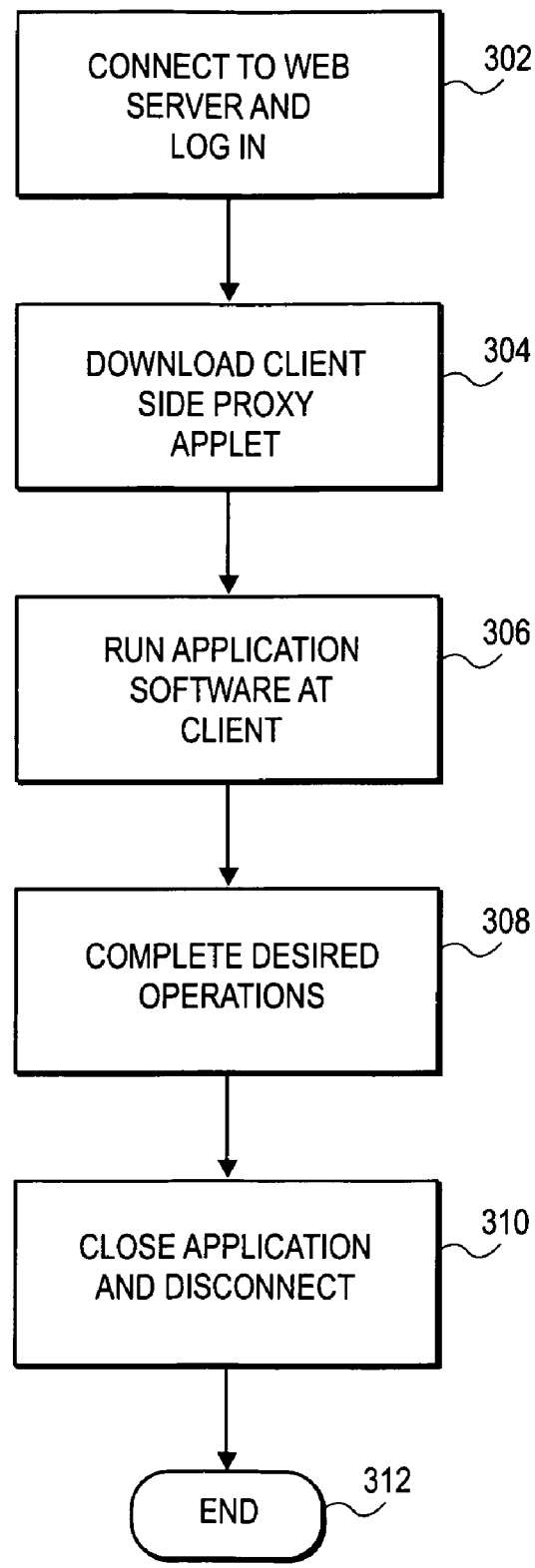
FIG. 3 is a flow chart illustrating a process used in one embodiment to provide remote access to network applications using a dual proxy.

FIG. 3 is a flow chart illustrating a process used in one embodiment to provide remote access to network applications using a dual proxy. The process begins in step 302, in which browser software at a remote client, such as remote client 202 of FIG. 2, is used to connect to a web server associated with a private network, such as a web server residing on dual homed proxy server 206 of FIG. 2, and to log in as an authorized remote user of applications on the private network. In one embodiment, the web server is configured to invoke an authentication process, such as one configured to request, receive, and verify a username and/or password prior to granting access authorization to a remote user attempting to log in to the private network remotely via the web server. In one embodiment, the authentication process may reside on the same physical machine as the web server. In one alternative embodiment, the authentication process may reside on another server, separate from the web server, such as a dedicated authentication server, and the web server may be configured to communicate with the authentication process either through a direct or network connection.

In step 304 of the process shown in FIG. 3, a client side proxy applet is downloaded from the web server to the remote client. In one embodiment, the client side proxy applet comprises a browser-executable applet capable of being executed by a commonly used web browser. In one embodiment, the client side proxy applet comprises a Java applet. In other embodiments, other types of browser-executable and/or self-executable applets may be used.

In one embodiment, the client side proxy applet downloaded in step 304 is configured to monitor incoming network traffic directed to any address beginning with "127", i.e., any IP address of the form "127.x.y.z", which is the form used to designate local host or "loop back" traffic. In other embodiments, the applet may be configured to monitor one or more other or different IP addresses. In one embodiment, any IP address that the remote system is capable of monitoring may be used.

In step 306, a user invokes and the remote client system runs client side application software installed on the remote client. In one embodiment, the client side application software invoke and run in step 306 is the same as that used by the remote client or other clients to access the application when connected physically to the private network, e.g., in the case of a laptop that has a docking station to connect to the private network but is also configured to connect to the private network remotely via the public network as described herein. In one embodiment, as described more fully below in connection with FIGS. 5 and 6, when the client side application software is invoked it looks for the corresponding application server on the private network by querying a domain name server, such as domain name server 214 of FIG. 2, to obtain an IP address associated with the application server. In one embodiment, the domain name server is configured to return to the client side application software the IP address 127.0.0.1, or some other local host IP address, instead of the actual internal or external IP address of the application server. In one such embodiment, the client side proxy applet downloaded in step 304, which as noted above monitors traffic to local host addresses such as 127.0.0.1, receives any network traffic sent by the client side application software to what the client side application software believes to be the application server, and acts in conjunction with other elements as a proxy for the application server, as described more fully below. The client side proxy applet downloaded in step 304 is configured to establish a connection via a public network with a server side proxy running at a dual homed host server associated with the private network that has an external connection to the public network and an internal connection to the private network, such as the dual home proxy server 206 of FIG. 2, upon receipt of an indication that a client side application software installed at the local host (i.e., the remote client) on which the applet is running has been invoked and is attempting to establish a connection with the corresponding application server. In one embodiment, the server side proxy is in turn configured to establish a connection via the private network with the application server on behalf of the remote client, acting as a proxy for communications between the application server and the client side proxy applet.

The process of running an application at the remote client, including more detailed information about processes used in certain embodiments to establish a connection with the corresponding application server on the private network, is described more fully below in connection with FIG. 8.

In step 308 of the process shown in FIG. 3, the user employs the client side application software to complete desired operations, in the same manner as when the remote client is connected locally to the private network. Requests and responses are exchanged between the client side application software and the application server via a chain comprising the following related segments or constituent network connections: (1) the connection between the client side application software and the client side proxy; (2) the connection between the client side proxy and the server side proxy; and (3) the connection between the server side proxy and the application server.

The process used in one embodiment to complete desired operations using the application software is described in more detail below in connection with FIGS. 9A and 9B.

In step 310 of the process shown in FIG. 3, the user closes the client side application software at the remote client, which in one embodiment results in all of the related network connections being disconnected. The process shown in FIG. 3 then ends in step 312.

Figure 4:
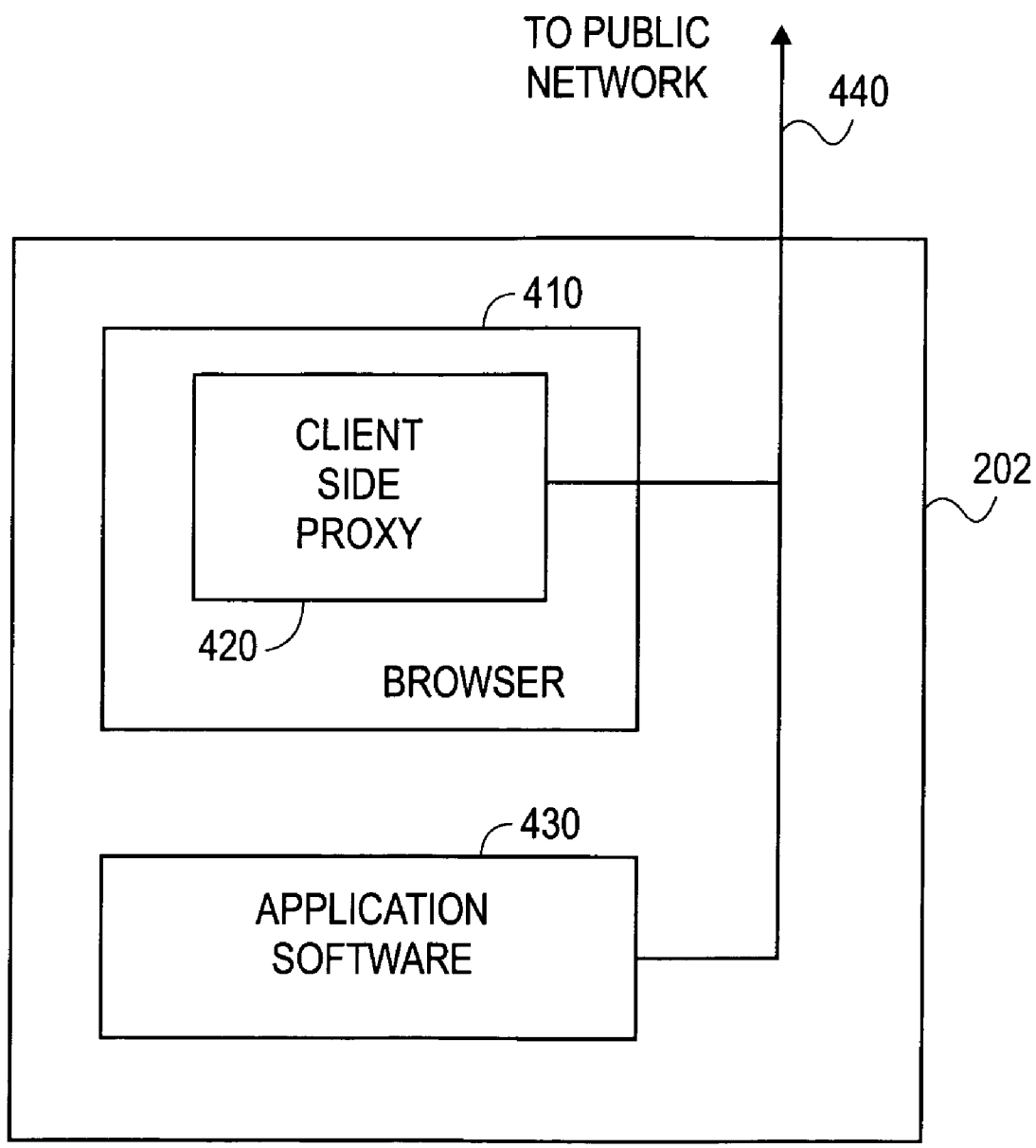
FIG. 4 is a schematic drawing of the remote client 202 of FIG. 2 as implemented in one embodiment.

FIG. 4 is a schematic drawing of the remote client 202 of FIG. 2 as implemented in one embodiment. FIG. 2 shows a web browser 410, a client side proxy applet 420, and client side application software 430 running on the remote client 202. A network connection 440 to the public network 204 of FIG. 2 is shown. Each of the web browser 410, the client side proxy applet 420, and the client side application software 430 is configured to send and receive network traffic via the network connection 440. As noted above, in one embodiment the application software 430 is led to believe that the application server has an IP address in the form of 127.x.y.z, and the client side proxy 420 is configured to listen for traffic sent to such a local host address. In this manner, network traffic (i.e., data packets) sent by the application software 430 to the IP address the application software 430 believes corresponds to the application server on the private network is instead received and processed by the client side proxy 420, which acts as a proxy for the application server with respect to the application software 430. Likewise, in one embodiment the client side proxy 420 is configured to receive via the public network 204 and network connection 440 data originating from the application server on the private network and intended for the client side application software 430, and to pass such data on to the client side application software 430, as described more fully below in connection with FIGS. 8, 9A, and 9B.

Figure 5:
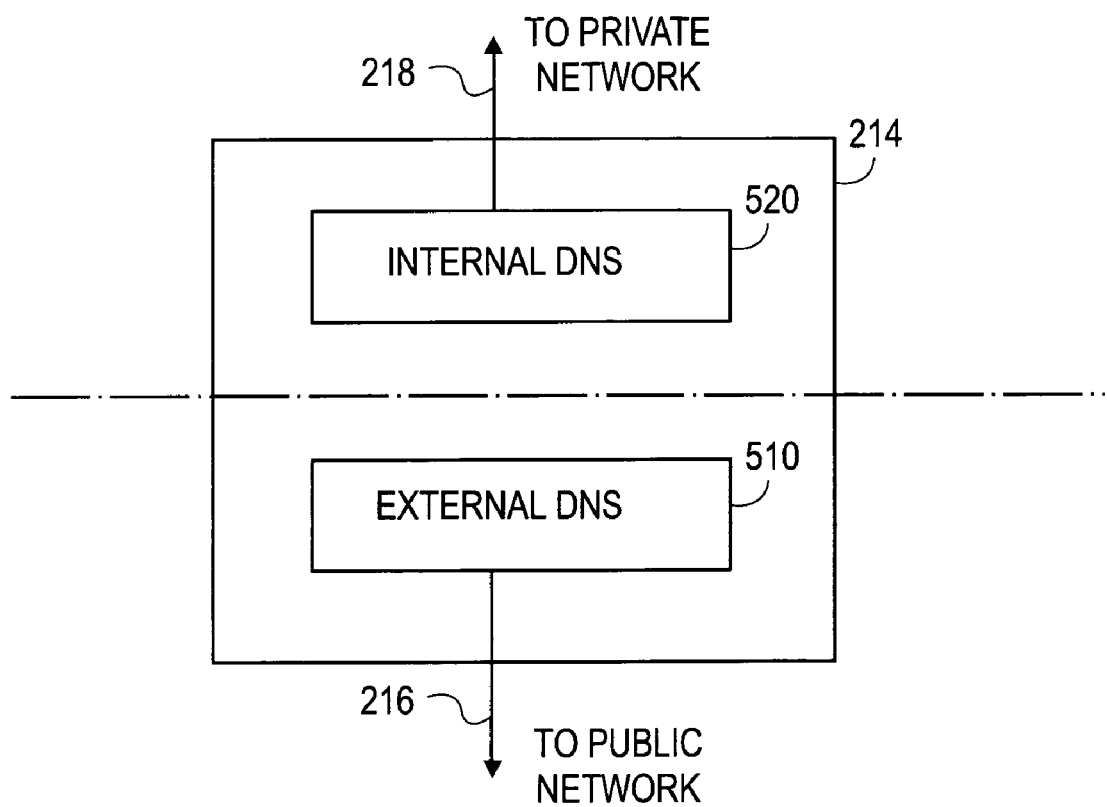
FIG. 5 is a schematic drawing showing more details of the domain name server (DNS) 214 of FIG. 2 as implemented in one embodiment.

FIG. 5 is a schematic drawing showing more details of the domain name server (DNS) 214 of FIG. 2 as implemented in one embodiment. As shown in FIG. 5, in one embodiment the domain name server 214 comprises an external domain name server 510 connected to the public network 204 via external network connection 216, as well as an internal domain name server 520 connected to the private network 210 via internal network connection 218. In one alternative embodiment, the external DNS 510 and the internal DNS 520 reside on physically separate systems. The external DNS 510 is configured to handle all queries from sources external to the private network 210, e.g., requests received via the public network 204, for IP address information associated with a unique hostname associated with the private network for which the external DNS 510 serves as the domain name server. Likewise, the internal DNS 520 is configured to handle all internal queries, i.e., those received via the private network 210, for IP address information associated with a unique hostname associated with the private network.

In one embodiment, the internal DNS 520 is configured to return the actual private network IP address of the associated application server. For example, in the case of a fictitious domain named "corp123.com", the client side application software might be configured to look for the application server using the unique hostname "application1.corp123.com". The private network associated with the domain name "corp123.com" might have a network identifier of "192.168.1" and assign IP addresses in the form 192.168.1.x to systems connected to the private network. In such a network, the application corresponding to the unique hostname "application1.corp123.com" might be assigned the IP address 192.168.1.1, which actual IP address the internal DNS 520 would be configured to return in response to an internal request for an IP address associated with the UNIQUE HOSTNAME "application1.corp123.com". In one embodiment, the external DNS 510 is configured to return a local host or "loop back" IP address, i.e., one in the form 127.x.y.z, in response to an external request for an IP address associated with the UNIQUE HOSTNAME "application1.corp123.com". In this manner, remote clients attempting to connect to the application server on the private network associated with a particular application are led to believe that the application server resides at an IP address associated with the remote client itself, which facilitates the dual proxy approach described herein by causing the client side application software to establish a connection to and send and receive packets to and from the client side proxy applet running on the remote client, as if the client side proxy applet were the application server.

Figure 6:
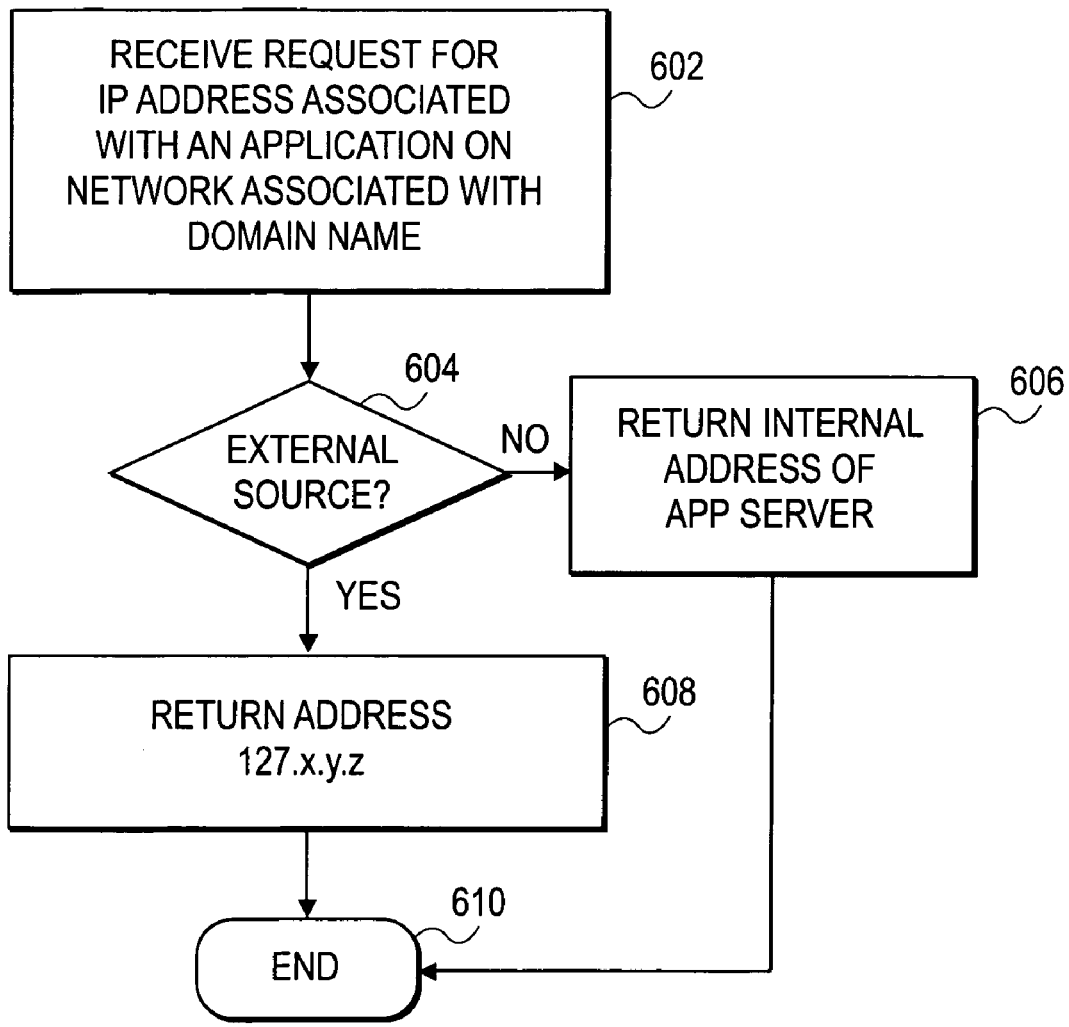
FIG. 6 is a flow chart illustrating a process implemented in one embodiment on a domain name server associated with a private network, such as the domain name server 214 of FIG. 2.

FIG. 6 is a flow chart illustrating a process implemented in one embodiment on a domain name server associated with a private network, such as the domain name server 214 of FIG. 2. The process starts in step 602, in which the domain name server receives a request for an IP address associated with an application residing on the private network associated with the domain name server. In one embodiment, as described above, the application is identified using a unique hostname comprising the domain name of the domain associated with the domain name server. In step 604, it is determined whether the request received in step 602 came from an external source. If it is determined in step 604 that the request did not come from an external source (i.e., it originated from within the internal, private network), the process proceeds to step 606, in which the domain name server returns to the source of the request the actual IP address on the private network of the application server on which the application resides, after which the process ends in step 610. If it is determined in step 604 that the request did come from an external source (i.e., it originated from outside the private network), the process advances to step 608, in which a local host address in the form 127.x.y.z is returned to the source of the request. In one embodiment, the domain name server is configured to return in response to an external request a prescribed local host address associated with the particular application to which the remote client is attempting to connect. In one such embodiment, the client side proxy running at the remote client is configured to determine based on the particular local host address used which application the remote client is attempting to access. In one alternative embodiment, the domain name server is configured to return in response to an external request the same prescribed local host address, regardless of the application the remote client is attempting to access. In one such embodiment, the client side proxy running at the remote client is configured to listen to and process all traffic sent to the prescribed local host address, and to use information other than the local host IP address to determine which application the remote client desires to access.

Figure 7:
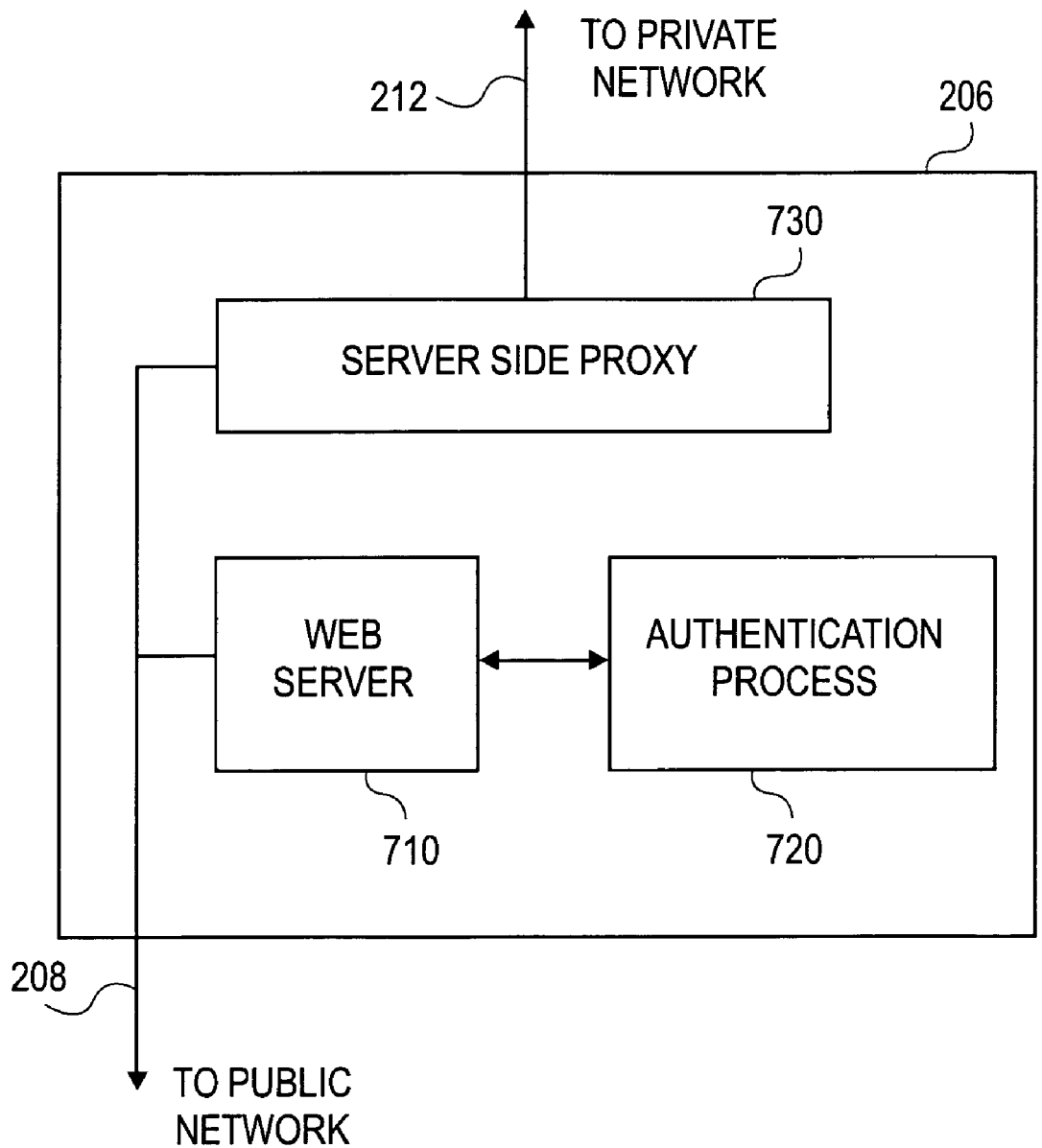
FIG. 7 is a schematic drawing showing further details of the dual homed proxy server 206 of FIG. 2 as implemented in one embodiment.

FIG. 7 is a schematic drawing showing further details of the dual homed proxy server 206 of FIG. 2 as implemented in one embodiment. As shown in FIG. 7, in one embodiment the dual homed proxy server 206 comprises a web server 710 having a communication path to an authentication process 720. As noted above, while the authentication process 720 is shown in FIG. 7 as residing in the same server as web server 710, in alternative embodiments the authentication process 720 may reside in another physical system or location and may be accessed by the web server 710 either directly or via the private network. The dual homed proxy server 206 is shown in FIG. 7 as further comprising a server side proxy 730. The server side proxy 730 is connected to the private network 210 via external network connection 212. Both server side proxy 730 and web server 710 are connected to the public network 204 via external network connection 208. In one embodiment, the server side proxy 730 is associated with an external IP address at which it is configured to send and receive network traffic over the public network 204 via external network connection 208. In one embodiment, the server side proxy is also associated with an internal IP address on the private network 210, at which it is configured to send and receive network traffic over the private network 210 via internal network connection 212. In this manner, server side proxy 730 is configured to terminate an external TCP/IP connection with a remote source, such as a connection to the client side proxy running on the remote client for sending encrypted network traffic, such as HTTPS traffic, as described above, using its external IP address, and at the same time to terminate an internal TCP/IP connection with an application server on the private network using its internal IP address, whereby it is able to act as a proxy for communications between the application server and the remote source (such as the client side proxy, as described above).

The following description provides more detailed information regarding the processes and techniques described above for providing remote access to network applications using a dual proxy, as implemented in particular embodiments.

Figure 8:
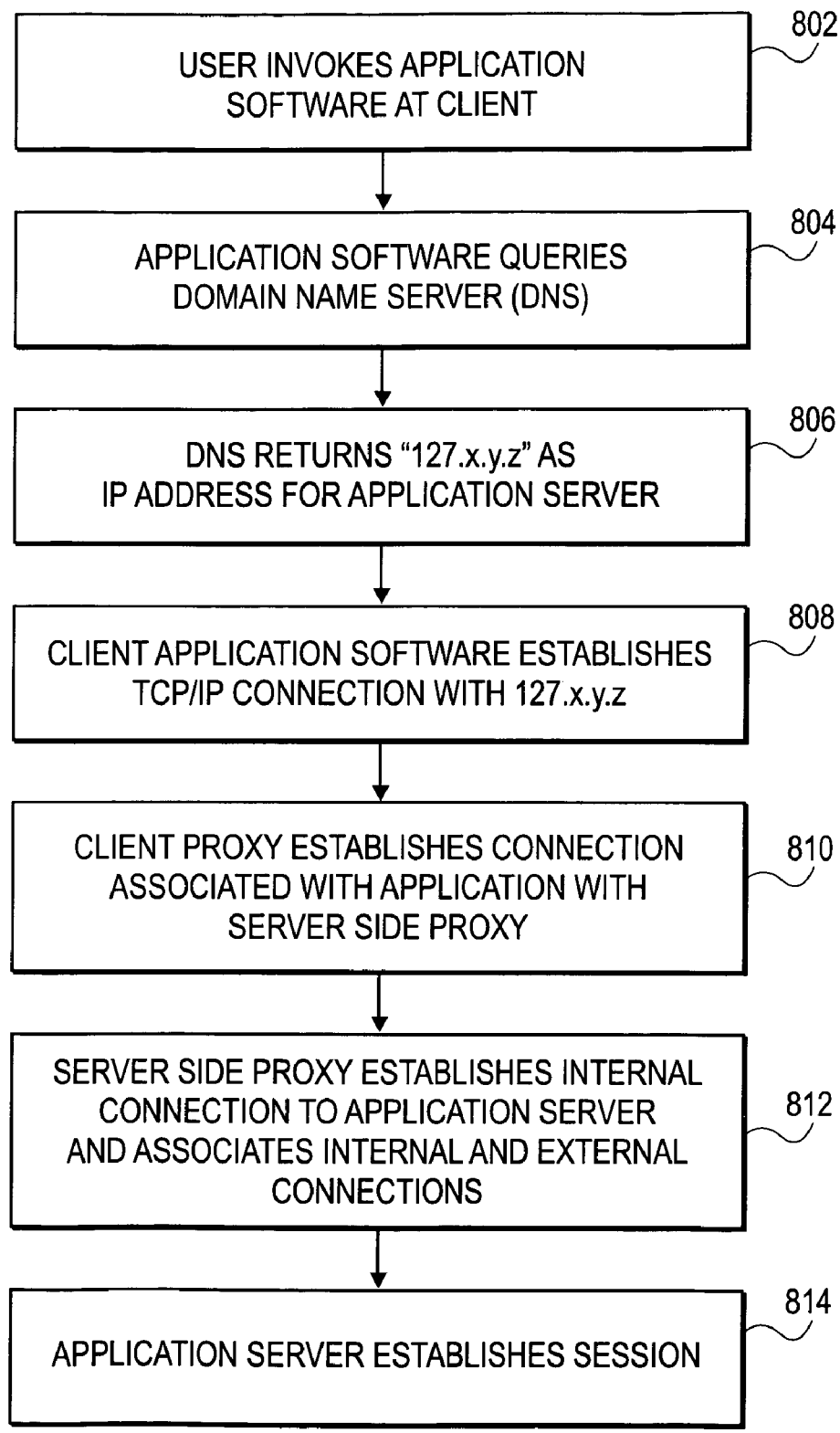
FIG. 8 is a flow chart illustrating a process used in one embodiment for invoking and running an application from a remote client, as in step 306 of the process shown in FIG. 3.

FIG. 8 is a flow chart illustrating a process used in one embodiment for invoking and running an application from a remote client, as in step 306 of the process shown in FIG. 3. The process begins with step 802, in which a user invokes at a remote client, such as remote client 202 of FIG. 2, client side application software associated with an application the user wishes to use. In step 804, the client side application software sends a query to a domain name server (DNS), such as DNS 214 of FIG. 2, to determine an IP address associated with a unique hostname associated with the application. In step 806, the DNS returns to the application program running on the remote client an IP address in the form 127.x.y.z.

In step 808, the client side application software establishes a TCP/IP connection with the IP address returned by the DNS. As noted above, an IP address in the form 127.x.y.z is a local host or "loop back" address for the local host sending network traffic to that address. As described above, in one embodiment the client side proxy applet running on the remote client is configured to listen for any network traffic directed to a local host address. In one embodiment, the client side proxy is configured to establish a TCP/IP connection with the client side application software running on the remote client when the client side application software requests such a connection using the local host address returned by the DNS as described above.

In step 810, the client side proxy establishes a TCP/IP connection with the server side proxy running at a proxy server associated with the private network with which the client side proxy is associated, such as the dual homed proxy server 206 of FIG. 2. In one embodiment, the client side proxy and the server side proxy are configured to exchange data using the secure hypertext transfer protocol (HTTPS) via the connection established in step 810. In one embodiment, the client side proxy is configured to establish the TCP/IP connection with the server side proxy at an external IP address associated with the server side proxy. In one embodiment, more than one external IP address is associated with the server side proxy, and the client side proxy is configured to use a particular IP address based on the network application the remote user has invoked. In one embodiment, the server side proxy is configured to receive external network traffic on more than one port, and the client side proxy is configured to establish a connection with the server side proxy using a port that corresponds to the network application the remote user has invoked. In one embodiment, the server side proxy is associated with only one external IP address and port and the client side proxy is configured to send data to the server side proxy to identify to the server side proxy the network application the user has invoked. In one embodiment, one or more of the above-mentioned configurations and techniques may be used in combination, depending on the needs of a particular implementation.

In step 812 of the process shown in FIG. 8, the server side proxy establishes an internal network connection via the private network with the application server on the private network associated with the application the remote user has invoked on the remote system. As noted in the preceding paragraph, depending on the particular implementation the server side proxy may determine which application the remote user wishes to access based on the external IP address used by the client side proxy to establish a connection to the server side proxy, the port number used by the client side proxy to establish a connection to the server side proxy, data sent from the client side proxy to the server side proxy, some combination of two or more of the preceding techniques, or by any other method suitable for enabling the server side proxy to determine which application is being accessed, including data format, data content, etc.

In one embodiment, the server side proxy is configured to establish a mapping between the external connection between the client side proxy and the server side proxy establish in step 810, on the one hand, and the internal connection between the server side proxy and the application server established in step 812. In one embodiment, the mapping is used by the server side proxy to associate data received from the client side proxy with the corresponding connection between the server side proxy and the application server, and conversely to associate data received from the application server with the corresponding connection between the server side proxy and the client side proxy. In this way, the server side proxy can act as a relay between the application server and the client side proxy, which enables the client side proxy to act as a proxy for the application server with respect to the client side application software running on the remote client. In one embodiment, the server side proxy uses a table to establish the mapping. In one embodiment, the server side proxy uses a pointer to establish the mapping. In one embodiment, the server side proxy uses a software object configured to map the corresponding external and internal connections to each other.

In step 814 of the process shown in FIG. 8, the application server establishes a session associated with the connection established by the server side proxy with the application server. The session is used in one embodiment to track data and operations being performed for a particular client, such as the remote client associated with the connection established by the server side proxy with the application server. In one embodiment, the application server may be configured to associate data and operations associated with a particular connection by assigning a locally unique session identifier to the session and sending the session identifier to the client, such as to the remote client via the server side proxy and the client side proxy, so that the session identifier may be included by any participating system in any communications associated with the session. In such an embodiment, the server side proxy is configured to use its own internal IP address when establishing a connection with the application server. In one embodiment, no session identifier is assigned at least with respect to one or more applications and the application server is configured to track data and operations associated with a particular connection based on the source IP address of the client with which the connection has been established. In one such embodiment, the server side proxy may be configured to have the capability to establish multiple internal connections to a single application server, such as to permit multiple remote clients to access the network application as described herein at the same time. In one such embodiment, the server side proxy may be configured to use as the source IP address when establishing a connection with the application server the IP address used by the remote client to establish the connection between the client side proxy and the server side proxy, as in step 810.

In one embodiment, the client side proxy is configured to pass to the server side proxy at or near the time at which the connection between the client side proxy and the server side proxy is established, as in step 810, data sent by the client side application software for purposes of establishing a session with the application running on the application server. In one embodiment, the server side proxy is configured to further relay such data to the application server via the internal connection established between the server side proxy and the application server, as in step 812. The application server may in such an embodiment use the relayed data to establish a session, and to send to the client side application software at the remote client, via the server side proxy and the client side proxy, an indication that the connection to the application server and the application session have been established successfully.

Figure 9A:
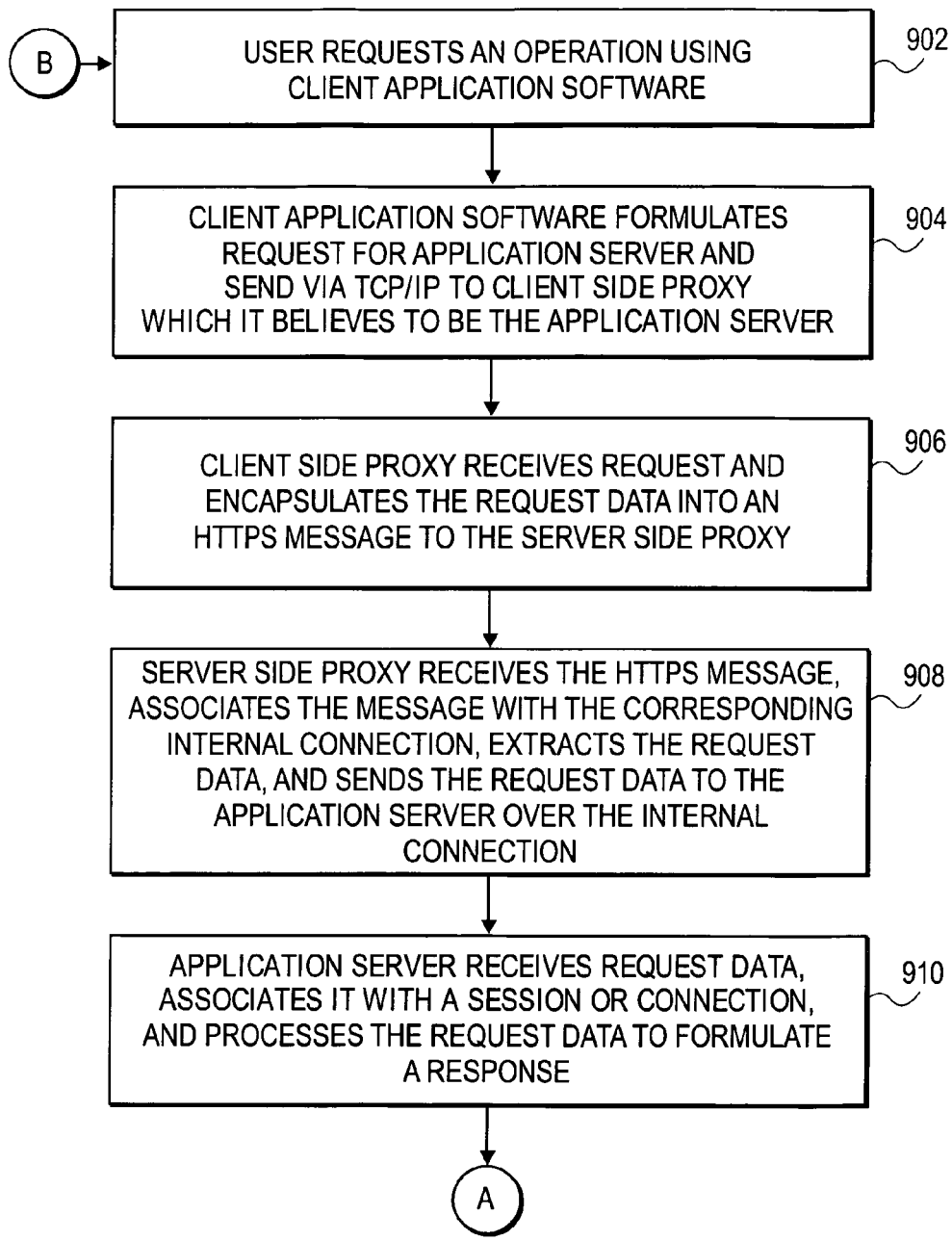
FIGS. 9A and 9B show a flow chart illustrating in further detail a process used in one embodiment to exchange data between the client side application software and the application server to enable a remote user to complete desired operations using the network application, as in step 308 of the process shown in FIG. 3.
Figure 9B:
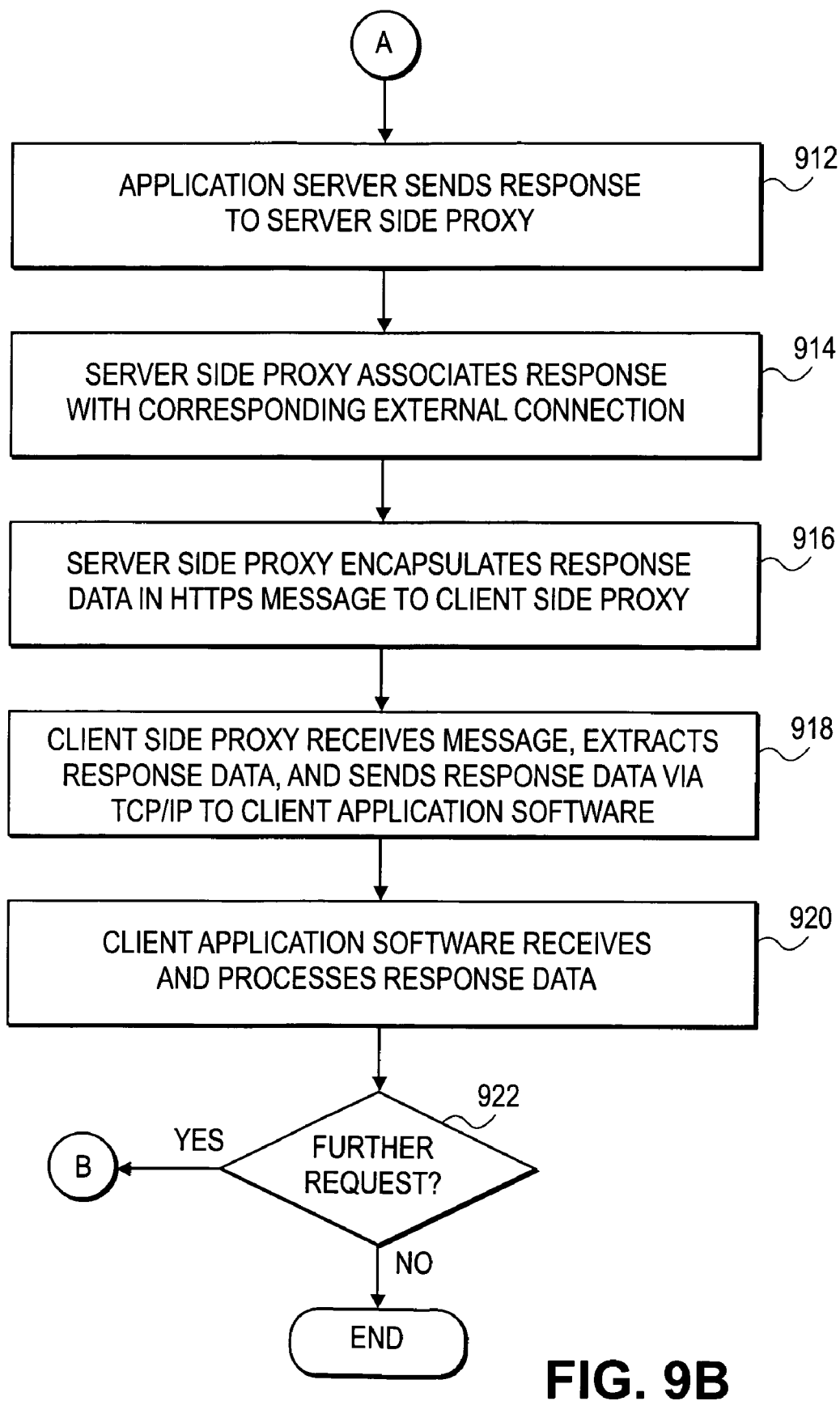

FIGS. 9A and 9B show a flow chart illustrating in further detail a process used in one embodiment to exchange data between the client side application software and the application server to enable a remote user to complete desired operations using the network application, as in step 308 of the process shown in FIG. 3.

Referring first to FIG. 9A, the process shown in FIGS. 9A and 9B begins with step 902, in which a user at the remote client requests an operation using the client side application software running at the remote client, such as by entering a command, selecting an option, entering data, etc. In step 904, the client side application software formulates a request or other message (referred to in the ensuing discussion of FIGS. 9A and 9B as "the request") for the application server, based at least in part on the user input made in step 902, and sends the request to the client side proxy at the local host IP address at which it has been led to believe the application server is located, as described above, via the connection established as described above between the client side application software and the client side proxy.

In step 906, the client side proxy receives the request, extracts the request data from the message it received via TCP/IP from the client side application software, encapsulates the request data in an HTTPS message addressed to the server side proxy, and sends the message comprising the encapsulated request data to the server side proxy using HTTPS via the connection established as described above between the client side proxy and the server side proxy. In other embodiments, protocols other than HTTPS may be used to send the request data from the client side proxy to the server side proxy. In step 908, the server side proxy receives the HTTPS message from the client side proxy, associates the message with the corresponding internal connection between the server side proxy and the application server, extracts the request data from the message, and sends the request data to the application server in a properly formatted message using TCP/IP over the internal connection between the server side proxy and the application server that corresponds to the external connection between the server side proxy and the client side proxy over which the data was received.

In step 910, the application server receives the request data from the server side proxy, associates it with the session or connection to which it corresponds, and processes the request data to formulate a response, if applicable and/or required based on the data received. Referring now to FIG. 9B, after step 910 the process continues with step 912, in which the application server sends to the server side proxy via TCP/IP over the private network a response intended for the client side application software running on the remote client. In step 914, the server side proxy associates the response received from the application server with the corresponding external connection between the server side proxy and the client side proxy (i.e., the external connection over which the original request data was received in step 908). In step 916, the server side proxy extracts the response data from the response message received from the application server, encapsulates the response data in an HTTPS message addressed to the client side proxy, and sends the HTTPS message containing the response data to the client side proxy via the external connection between the server side proxy and the client side proxy.

In step 918, the client side proxy receives from the server side proxy the HTTPS message containing the response data, extracts the response data, and sends the response data via TCP/IP to the client side application software running on the remote client. In step 920, the client side application software receives and processes the response data. In step 922, it is determined whether a further request requiring that the application server be accessed has been initiated at the remote client. If no further request has been initiated, the process ends in step 924. If a further request is initiated, the process returns to the beginning of the process shown in FIGS. 9A and 9B, beginning with step 902, and repeats as described above.

While the process as shown in FIGS. 9A and 9B, and as described above in connection with said FIGS. 9A and 9B, uses as an example an exchange in which the remote client initiates a request and the application server ultimately receives the request data, the process may be used as well, in slightly modified form, for an exchange initiated by the application server and responded to by the remote user using the client side application software at the remote client. In such a case, steps 912 through 920 would be completed first, with the "response" instead being a "request", followed by steps 902 through 910, with the "request" instead being a "response". Likewise, steps 902 through 910 may be completed for a one-way communication from the client side application software at the remote client to the application server that does not require or prompt a response from the application server, in which case the application server does not formulate a response in step 910 and steps 912 through 920 are omitted. Likewise, the application server may send a one-way communication to the client side application software at the remote client through a sub-process comprising steps 912 through 920, even though steps 902 through 910 have not been taken with respect to such a one-way communication. In one embodiment, the remote client must have initiated a connection to the application server, and a session associated with the remote client must already have been established at the application server, in order for the application server to be able to initiate any request or one-way communication to the remote client.

The dual proxy approach disclosed herein overcomes the shortcomings of the prior art approaches described above. For example, using the dual proxy approach disclosed herein, it is not necessary to install client side software, such as VPN software, or to otherwise configure client systems in advance to be able to connect to applications on the private network. Instead, generic capabilities typically present on any client system, such as the operating system and/or generic browser software, may be used to download and run a client side proxy at the time the client system is used to access the private network. Similarly, it is not necessary to write customized software modules for each application to be accessed remotely, as is required for the extranet-in-a-box approach. Instead, a generic service side proxy at the proxy server used to connect to the private network acts as the intermediary for any application, including legacy applications. In addition, the native capabilities of client side application software may be used, so that the remote user is not restricted to a limited functionality web-based version of the application.

While the above description describes embodiments having particular characteristics and implementations, the invention disclosed herein is not limited to such embodiments. For example, while the system shown in FIG. 2 describes an internal private network 210 and an external public network 204, the approach described herein may be used as well in any situation in which controlled remote access to a network application on a first network is to be made available to users on a second network, regardless of the identity, nature, ownership, or type of network. For example, both networks could be private networks. Likewise, while particular network communication protocols are described above, any suitable network communication protocol may be used for the various network connections described, as will be apparent to those of ordinary skill in the art.

In addition, although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. A method for providing remote access via a first network to an application residing on an application server comprising part of a second network, comprising:
   receiving from a remote client on the first network a request to access the second network, the remote client having installed on it a client side application software associated with the application;
   sending to the remote client, in response to said request to access the second network, a client side proxy applet;
   causing the client side application software to establish with the client side proxy applet a connection associated with the application, wherein causing the client side application software to establish with the client side proxy applet a connection associated with the application comprises providing to the client side application software an indication that a network address monitored by the client side proxy is associated with the application;
   providing on a proxy server associated with the second network a server side proxy configured to communicate with the client side proxy applet via the first network and to communicate with the application server via the second network;
   wherein the client side proxy applet is executed on the remote client and is configured to relay data between the remote client and the server side proxy and the server side proxy is configured to relay data between the client side proxy applet and the application server; and
   wherein the client side proxy applet acts as a proxy for the application server with respect to the client side application software and the server side proxy acts as a proxy for the application server with respect to the client side proxy applet, the client side proxy applet and the server side proxy thereby acting as a dual layer proxy for the application server with respect to the client side application software.

2. The method of claim 1, wherein the step of sending a client side proxy applet to the remote client comprises sending the client side proxy applet to the remote client via the first network.

3. The method of claim 1, wherein the client side proxy applet comprises browser-executable code.

4. The method of claim 3, wherein the client side proxy applet comprises Java code.

5. The method of claim 1, wherein the client side proxy applet comprises self-executable code.

6. The method of claim 1, further comprising completing an authorization process prior to providing the client side proxy applet to the remote system.

7. The method of claim 6, wherein the authorization process comprises:
   prompting the remote client to supply authorization data indicating the remote client is authorized to access the application;
   receiving said authorization data from the remote client; and
   verifying based at least in part on the authorization data that the remote client is authorized to access the application.

8. The method of claim 7, wherein the step of verifying comprises querying an authorization process by sending to the authorization process a query comprising the authorization data.

9. The method of claim 8, wherein the authorization data is received at a first system associated with the second network and the authorization process resides on a second system associated with the second network, the second system being physically separate from the first system.

10. The method of claim 1, wherein the client side proxy applet is configured to monitor at least one network address that the remote client system to which the client side proxy applet has been downloaded is capable of monitoring and wherein the step of providing to the client side application software an indication that a network address monitored by the client side proxy is associated with the application comprises providing to the client side application software an indication that the at least one network address associated with the remote client to which the client side proxy applet has been downloaded is associated with the application.

11. The method of claim 10, wherein:
   the client side proxy applet is configured to monitor a plurality of network addresses that the remote client system to which the client side proxy applet has been downloaded is capable of monitoring; and
   the step of sending to the client side application software an indication that a network address monitored by the client side proxy is associated with the application comprises providing to the client side application software an indication that a selected one of the plurality of network addresses that the remote client system to which the client side proxy applet has been downloaded is capable of monitoring is associated with the application.

12. The method of claim 10, wherein the TCP/IP suite of network protocols is used and the at least one network address that the remote client system to which the client side proxy applet has been downloaded is capable of monitoring comprises a local host IP address.

13. The method of claim 10, wherein the at least one network address that the remote client system to which the client side proxy applet has been downloaded is capable of monitoring is provided to the client side application software in response to a query sent by client side application software to request a network address associated with the application.

14. The method of claim 13, further comprising:
   providing a domain name server configured to receive via the first network a request from the client side application software for a network address associated with the application, and to return to the client side application software via the first network a reply indicating that the at least one network address that the remote client system to which the client side proxy applet has been downloaded is capable of monitoring is associated with the application.

15. The method of claim 14, wherein the domain name server is further configured to distinguish between requests received via the first network and requests received via the second network, and to respond to requests received via the first network by returning to the client side application software via the first network a reply indicating that the at least one network address that the remote client system to which the client side proxy applet has been downloaded is capable of monitoring is associated with the application and to respond to requests received via the second network by returning to the client side application software via the second network a reply indicating that a true network address of the application server on the second network is associated with the application.

16. The method of claim 1, wherein the server side proxy is configured to communicate with the client side proxy applet via the first network using a secure network communication protocol.

17. The method of claim 16, wherein the secure network communication protocol comprises the secure hypertext transfer protocol (HTTPS).

18. A method for providing remote access via a first network to an application residing on an application server comprising part of a second network, comprising:
  receiving from a remote client on the first network a request to access the second network, the remote client having installed on it a client side application software associated with the application;
  sending to the remote client, in response to said request to access the second network, a client side proxy applet;
  causing the client side application software to establish with the client side proxy applet a connection associated with the application;
  providing on a proxy server associated with the second network a server side proxy configured to communicate with the client side proxy applet via the first network and to communicate with the application server via the second network;
  establishing an external network communication session between the server side proxy and the client side proxy applet over the first network;
  establishing an internal network communication session between the server side proxy and the application server over the second network; and
  associating the external network communication session with the internal network communication session;
  wherein the client side proxy applet is executed on the remote client and is configured to relay data between the remote client and the server side proxy and the server side proxy is configured to relay data between the client side proxy applet and the application server; and
  wherein the client side proxy applet acts as a proxy for the application server with respect to the client side application software and the server side proxy acts as a proxy for the application server with respect to the client side proxy applet, the client side proxy applet and the server side proxy thereby acting as a dual layer proxy for the application server with respect to the client side application software.

19. The method of claim 18, further comprising:
  receiving at the server side proxy via the external network communication session a message from the client side proxy applet comprising request data provided to the client side proxy applet by the client side application software;
  associating the request data with the internal network communication session associated with the external network communication session via which the request data was received; and
  sending the request data to the application server via the associated internal network communication session.

20. The method of claim 19, further comprising:
  receiving at the server side proxy via the internal network communication session a message from the application server comprising response data provided by the application server in response to the request data;
  associating the response data with the external network communication session associated with the internal network communication session via which the response data was received; and
  sending the response data to the client side proxy applet via the associated external network communication session.

21. The method of claim 20, wherein the client side proxy applet is configured to relay the response data to the client side application software.

22. A system for providing remote access via a first network to an application residing on an application server comprising part of a second network, comprising:
  a proxy server having an internal network connection to the second network and an external network connection to the first network, the proxy server being configured to:
    receive from a remote client on the first network a request to access the second network, the remote client having installed on it a client side application software associated with the application;
    provide to the remote client, in response to said request to access the second network, a client side proxy applet; and
  a domain name server having an external connection to the first network, the domain name server being configured to cause the client side application software to establish with the client side proxy applet a connection associated with the application;
  wherein the client side proxy applet is configured to relay data between the remote client and the proxy server and the proxy server is configured to relay data between the client side proxy applet and the application server;
  whereby the client side proxy applet acts as a proxy for the application server with respect to the client side application software and the proxy server acts as a proxy for the application server with respect to the client side proxy applet, the client side proxy applet and the proxy server thereby acting as a dual layer proxy for the application server with respect to the client side application software.

23. The system of claim 22, wherein the proxy server is further configured to:
  establish an external network communication session between the proxy server and the client side proxy applet over the first network;
  establish an internal network communication session between the proxy server and the application server over the second network; and
  associate the external network communication session with the internal network communication session.

24. The system of claim 23, wherein the proxy server is further configured to:
  receive via the external network communication session a message from the client side proxy applet comprising request data provided to the client side proxy applet by the client side application software;
  associate the request data with the internal network communication session associated with the external network communication session via which the request data was received; and
  send the request data to the application server via the associated internal network communication session.

25. The system of claim 24, wherein the proxy server is further configured to:
  receive at the proxy server via the internal network communication session a message from the application server comprising response data provided by the application server in response to the request data;

associate the response data with the external network communication session associated with the internal network communication session via which the response data was received; and send the response data to the client side proxy applet via the associated external network communication session.

26. The system of claim 25, wherein the client side proxy applet is configured to relay the response data to the client side application software.

27. A computer readable storage medium that embodies computer program product for providing remote access via first network to an application residing on an application server comprising part of a second network, the computer program product comprising computer instructions, which, when executed by one or more processors, cause the one or more processors to perform the steps of:

receiving from a remote client on a first network a request to access the second network, the remote client having installed on it a client side application software associated with the application;

providing to the remote client, in response to said request to access the second network, a client side proxy applet;

causing the client side application software to establish with the client side proxy applet a connection associated with the application;

establishing an external communication session with the client side proxy applet via the first network;

establishing an internal communication session with the application server via the second network;

wherein the client side proxy is configured to relay data between the remote client and the server side proxy and the server side proxy is configured to relay data between the client side proxy applet and the application server;

whereby the client side proxy applet acts as a proxy for the application server with respect to the client side application software and the server side proxy acts as a proxy for the application server with respect to the client side proxy applet, the client side proxy applet and the server side proxy thereby acting as a dual layer proxy for the application server with respect to the client side application software.

28. The computer readable medium of claim 27, wherein the computer code comprises separate modules, one or more of which are installed on physically separate systems associated with the second network.

29. A method for redirecting a client side application software installed on a client system connected to a first network to a proxy applet that has been provided to the client system, the client side application software being associated with an application residing on an application server connected to a second network, comprising:

receiving via the first network an external request from the client side application software for a network address associated with the application; and providing to the client side application software an external reply indicating that a network address associated with the proxy applet is associated with the application.

30. The method of claim 29, wherein the proxy applet is configured to monitor at least one local host network address associated with the client system and the network address associated with the proxy applet comprises the at least one local host network address.

31. The method of claim 29, wherein the application server is associated with an internal network address on the second network and the method further comprises receiving via the second network from an internal source connected to the second network an internal request for a network address associated with the application and providing to the internal source via the second network an internal reply indicating that the internal network address of the application server on the second network is associated with the application.

32. A system for redirecting a client side application software installed on a client system connected to a first network to a proxy applet that has been provided to the client system, the client side application software being associated with an application residing on an application server connected to a second network, comprising:

a domain name server having an external network connection to the first network, the domain name server being configured to:

receive via the first network an external request from the client side application software for a network address associated with the application; and provide to the client side application an external reply indicating that a network address associated with the proxy applet is associated with the application.

33. The system of claim 32, wherein the proxy applet is configured to monitor at least one local host network address associated with the client system and the network address associated with the proxy applet comprises the at least one local host network address.

34. The system of claim 32, wherein the application server is associated with an internal network address on the second network and the domain name server has an internal network connection to the second network, and the domain name server is further configured to:

receive via the second network from an internal source connected to the second network an internal request for a network address associated with the application; and provide to the internal source via the second network an internal reply indicating that the internal network address of the application server on the second network is associated with the application.

35. A computer readable storage medium that embodies a computer program product for redirecting a client side application software installed on a client system connected to a first network to a proxy applet that has been provided to the client system, the client side application software being associated with an application residing on an application server connected to a second network, the computer program product comprising computer instructions which, when executed by one or more processors, causes:

receiving via the first network an external request from the client side application software for a network address associated with the application; and providing to the client side application software an external reply indicating that a network address associated with the proxy applet is associated with the application.

36. The computer readable medium of claim 35, wherein the proxy applet is configured to monitor at least one local host network address associated with the client system and the network address associated with the proxy applet comprises the at least one local host network address.

37. The computer readable medium of claim 35, wherein the application server is associated with an internal network address on the second network, wherein a domain name server has an internal network connection to the second network, and wherein the computer program product further comprises computer instructions for:

receiving via the second network from an internal source connected to the second network an internal request for a network address associated with the application; and providing to the internal source via the second network an internal reply indicating that the internal network address of the application server on the second network is associated with the application.

38. A physical storage medium that embodies a client side proxy applet for use in providing, to a remote client to which the applet has been provided, remote access via a first network to an application residing on an application server comprising part of a second network, the remote client having installed thereon client side application software associated with the application, the applet comprising computer instructions, which, when executed by one or more processors, cause:

monitoring at least one network address that the remote client is capable of monitoring;

using the at least one network address to establish a first network connection to the client side application software;

establishing a second network connection via the first network to a proxy server associated with the second network;

receiving from the client side application software via the first connection application data intended by the client side application software to be sent to the application server; and relaying the application data to the proxy server via the second network connection.

39. The physical medium of claim 38, wherein the computer instructions comprises browser-executable code.

40. The physical medium of claim 39, wherein the browser-executable code comprises Java code.

41. The physical medium of claim 38, wherein the computer instructions comprises self-executable code.

\* \* \* \* \*

UNITED STATES PATENT AND TRADEMARK OFFICE
CERTIFICATE OF CORRECTION

PATENT NO. : 7,359,933 B1  Page 1 of 1
APPLICATION NO. : 10/259183
DATED : April 15, 2008
INVENTOR(S) : Polen et al.

It is certified that error appears in the above-identified patent and that said Letters Patent is hereby corrected as shown below:

On the title page, in item [56], in column 2, under "Other Publications", line 6, delete "www.netetrity.com" and insert -- www.netegrity.com --, therefor.

On the title page, item [56] on page 2, in column 1–2, under "Other Publications", line 4–5 and 1–2, below "Line 3" delete "uRoam Corporation: "Comprehensive Secure User Access, Firepass Overview", http://www.uroam.com/index.php?side=home&home=products_enterprise uRoam Inc., "FirePass Product Brief", FirePass Product Brief 20021203.doc.".

In column 17, line 11, in claim 27, delete "computer readable" and insert -- computer-readable --, therefor.

In column 17, line 44, in claim 28, delete "computer readable" and insert -- computer-readable --, therefor.

In column 18, line 39, in claim 35, delete "computer readable" and insert -- computer-readable --, therefor.

In column 18, line 54, in claim 36, delete "computer readable" and insert -- computer-readable --, therefor.

In column 18, line 59, in claim 37, delete "computer readable" and insert -- computer-readable --, therefor.

Signed and Sealed this

Third Day of November, 2009

David J. Kappos
*Director of the United States Patent and Trademark Office*